(12) United States Patent
Bouche

(10) Patent No.: US 7,377,737 B2
(45) Date of Patent: May 27, 2008

(54) STORAGE LIFT

(75) Inventor: Norbert Bouche, Landau (DE)

(73) Assignee: Bellheimer Metallwerk GmbH, Bellheim/Pfalz (DE)

( * ) Notice: Subject to any disclaimer, the term of this patent is extended or adjusted under 35 U.S.C. 154(b) by 418 days.

(21) Appl. No.: 10/471,877

(22) PCT Filed: Mar. 20, 2002

(86) PCT No.: PCT/DE02/01071

§ 371 (c)(1),
(2), (4) Date: Sep. 12, 2003

(87) PCT Pub. No.: WO02/076858

PCT Pub. Date: Oct. 3, 2002

(65) Prior Publication Data

US 2004/0094495 A1 May 20, 2004

(30) Foreign Application Priority Data

Mar. 23, 2001 (DE) .............................. 101 15 757

(51) Int. Cl.
*B65G 1/00* (2006.01)
(52) U.S. Cl. ................. 414/277; 414/274; 414/416.03; 414/416.08
(58) Field of Classification Search ................ 414/277, 414/274, 416.03, 416.08
See application file for complete search history.

(56) References Cited

U.S. PATENT DOCUMENTS

| 5,278,410 A | * | 1/1994 | Boutet et al. ............... 250/589 |
| 5,427,489 A | * | 6/1995 | Chalmers et al. ........... 414/277 |
| 6,368,049 B1 | * | 4/2002 | Osaka et al. ................ 414/783 |
| 2001/0008984 A1 | * | 7/2001 | Omura et al. ............... 700/241 |

FOREIGN PATENT DOCUMENTS

| DE | 3929724 | 4/1990 |
| DE | 4233688 | 4/1994 |
| DE | 9218776 | 6/1995 |
| DE | 29606381 | 6/1996 |
| DE | 19501718 | 7/1996 |
| EP | 0722894 | 7/1996 |

* cited by examiner

*Primary Examiner*—Saul J. Rodriguez
*Assistant Examiner*—M. S. Lowe
(74) *Attorney, Agent, or Firm*—Mark P. Stone

(57) ABSTRACT

A storage lift has two shelving columns that support storage goods carriers (5). A vertical conveyor is located between the two shelving columns and at least one of the shelving columns has a loading and removal opening. A light grille (9, 10) and faceplates (11) are provided to determine or verify the position of the storage goods carriers (5) in the vicinity of the loading and removal opening (8). At least one faceplate is allocated to each storage goods carrier (5).

21 Claims, 3 Drawing Sheets

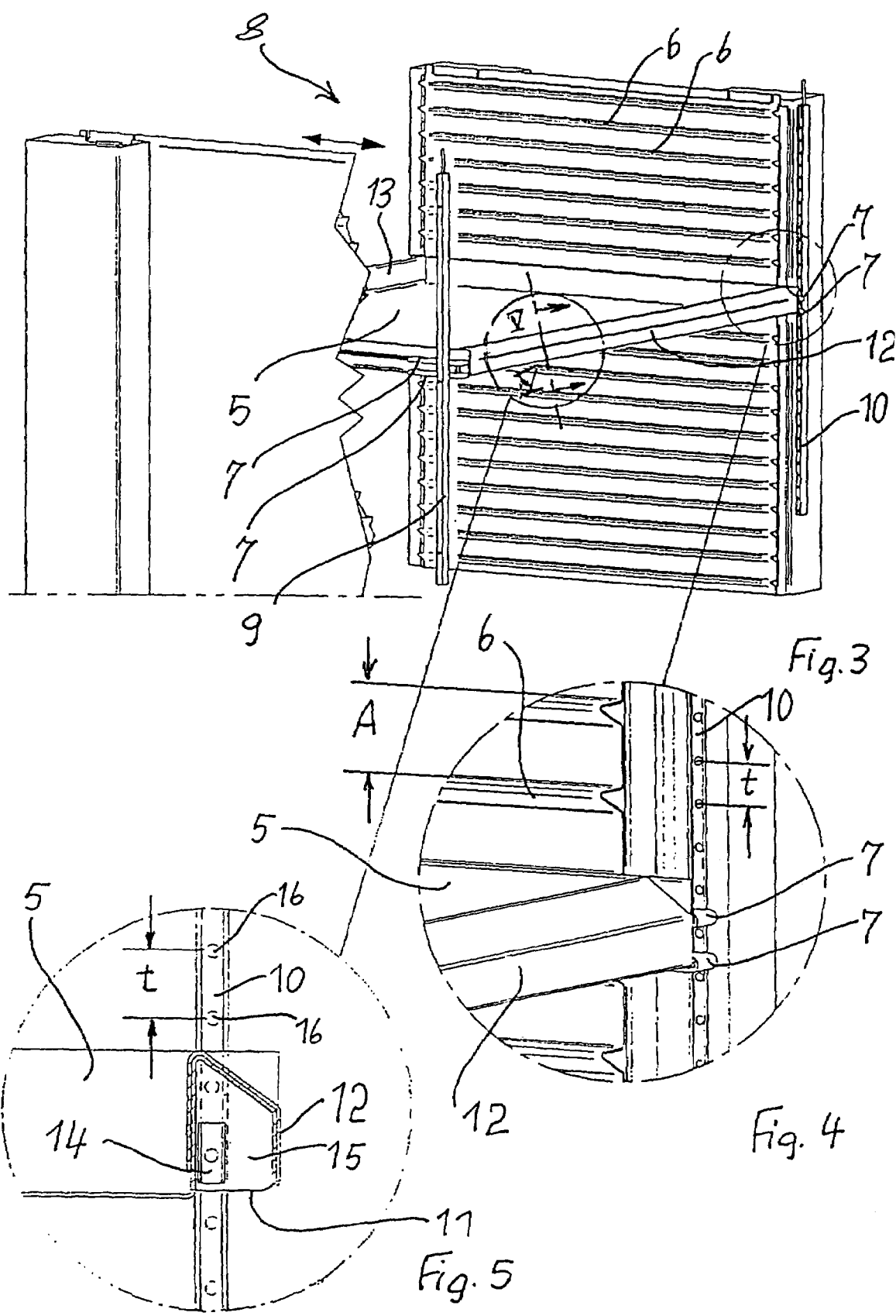

STORAGE LIFT

The invention relates to a storage lift comprising two shelving columns that are used to support storage goods carriers and are each provided with a large number of pairs of supporting profiles for storage goods carriers that are arranged one above another and at a distance from one another, of which columns at least one has a loading and removal opening equipped with a grid of lights for detecting the height of the storage goods, and also comprising a vertical conveyor which can be moved up and down in a shaft between the shelving columns and which is equipped with a horizontal conveyor device which has drivers by means of which the storage goods carriers can be transferred onto the vertical conveyor or removed from it.

In known storage lifts, the height of the storage goods arranged on the storage goods carriers is measured with the aid of the grid of lights—as described in DE 42 33 688 A1 and DE 195 01 718 A1, for example—in order to deposit the respective storage goods carriers at free storage spaces whose height most closely approaches the storage goods height, with the effect of optimal utilization of the stowage space available.

The invention is based on the object, in a storage lift of the type under consideration, with the aid of the grid of lights, specifically preferably the grid of lights used for the height measurement, to determine or to check the position of the storage goods carrier in the loading and removal opening. According to the invention, this object is achieved in that each storage goods carrier is provided with at least one faceplate through which in each case at least one light beam from the grid of lights can pass and by means of which at least one light beam from the grid of lights is masked out when the respective storage goods carrier assumes a predefined position in the loading and removal opening.

The storage lift according to the invention has the advantage that special sensors for checking the correct position of the storage goods carrier in the loading and removal opening are rendered superfluous, such a change is imperative, as is known, in order to ensure perfect transfer of the storage goods carrier from the loading and removal opening to the vertical conveyor.

Further features and details of the invention emerge from the subclaims and the following description of a particularly advantageous embodiment of the invention illustrated in the appended drawings, in which:

FIG. 3 shows a perspective partial view of the loading and removal opening of the storage lift according to FIG. 1, viewed from the inside of the storage lift;

FIG. 4 shows a detail IV of the partial view according to FIG. 3 on an enlarged scale and FIG. 5 shows a section along the line V-V in FIG. 3.

Figure 1:
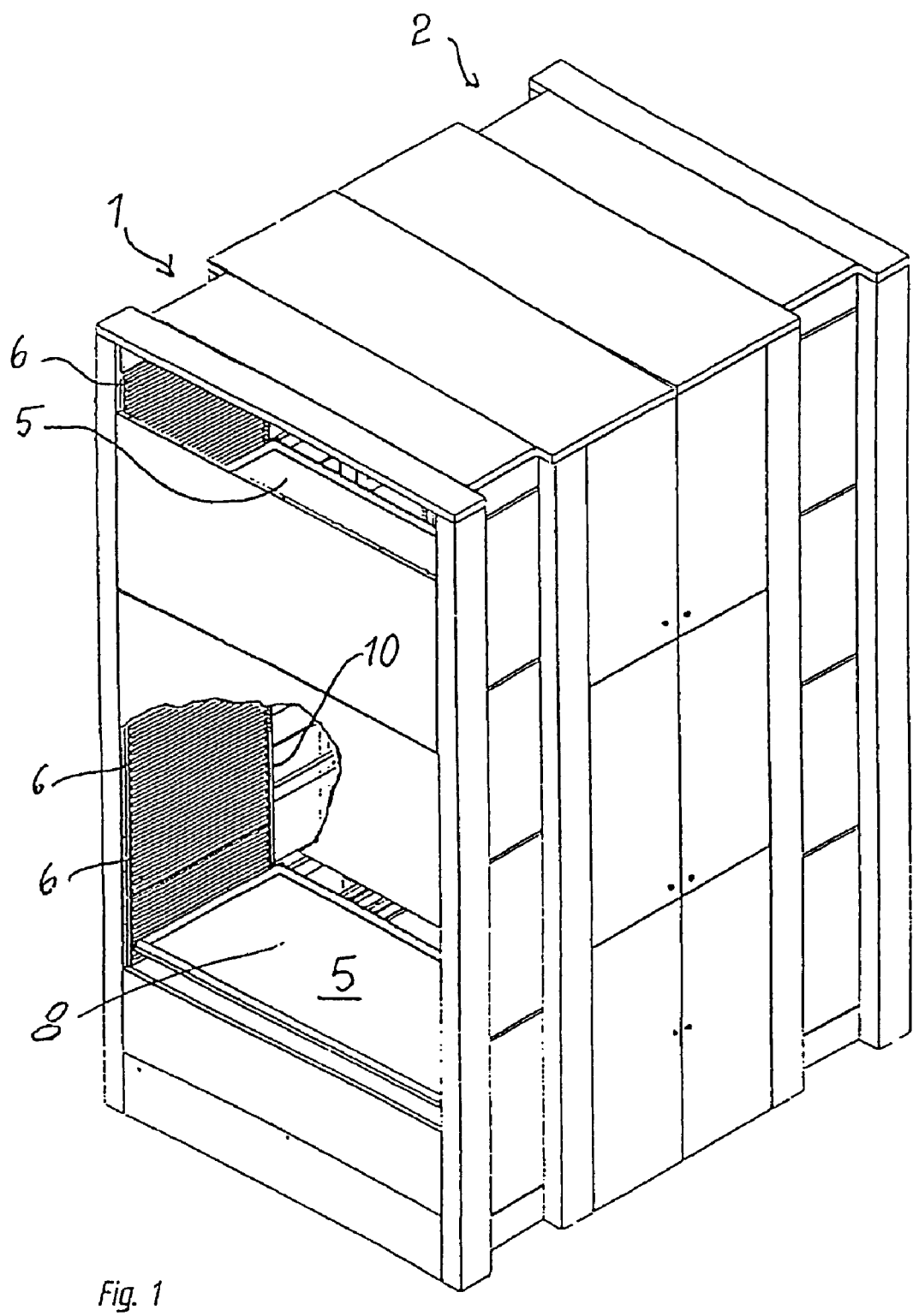
FIG. 1 shows the perspective view of a storage lift.
Figure 2:
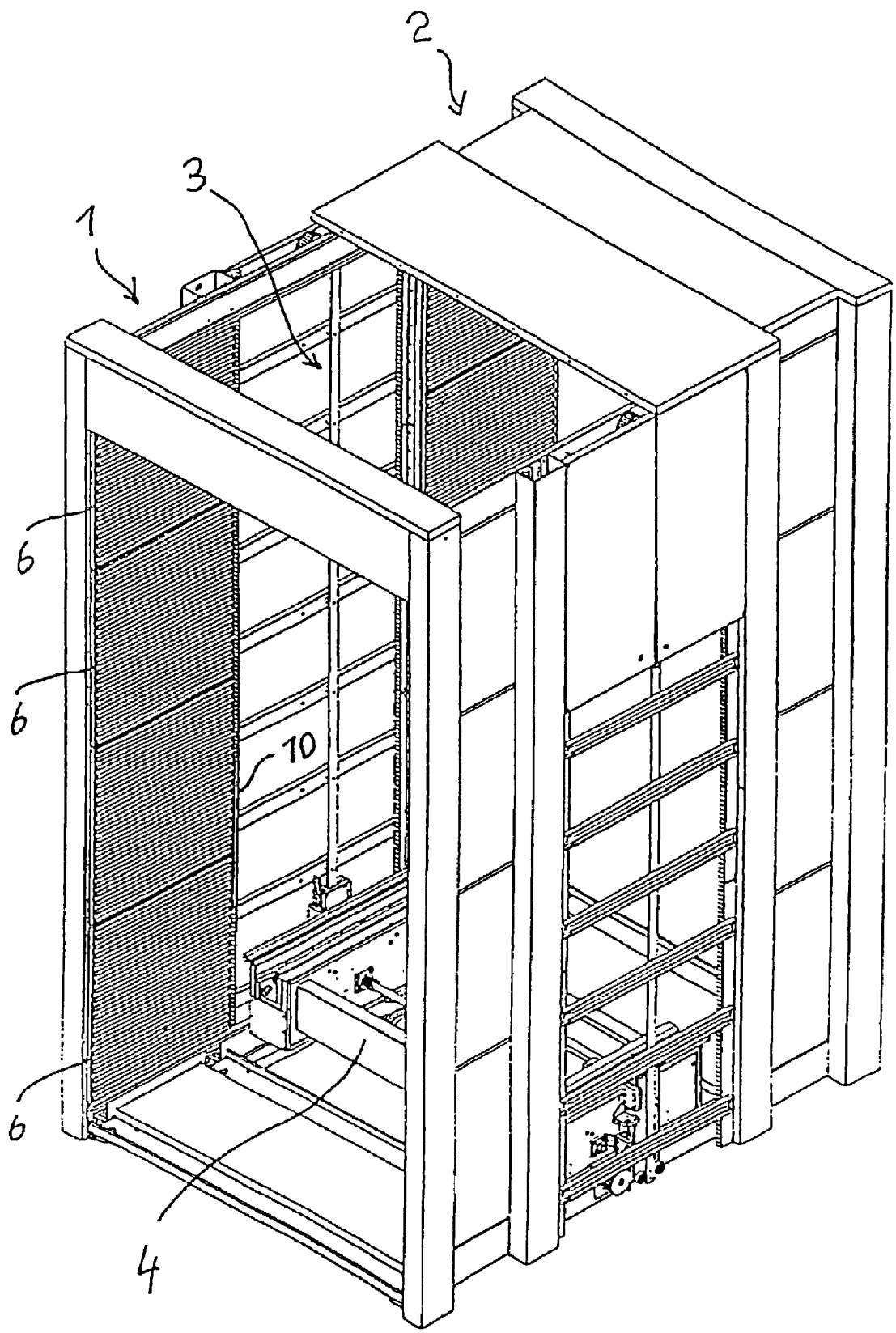
FIG. 2 shows a view corresponding to FIG. 1 of the storage lift after the removal of housing parts.

The storage lift shown in FIGS. 1 and 2 has, in a known way, two shelving columns 1 and 2 which delimit a shaft 3 in which a vertical conveyor 4 equipped with a horizontal conveyor device can be moved up and down in order to transfer storage goods carriers 5 to different spaces in the shelving columns 1 and 2. The individual storage spaces are in this case formed by supporting profiles 6 which are arranged one above another in pairs and at a distance from one another and which are used to support supporting webs 7 on opposite sides of the storage goods carriers 5. In a departure from known storage lifts—as can be seen from FIG. 1—in the storage lift shown, supporting profiles 6 are also provided in the region of the loading and removal opening of the storage lift and permit storage goods carriers 5 to be inserted in different vertical positions of the loading and removal opening 8. The respective operator consequently has the possibility of moving the storage goods carriers 5 to a position in the storage lift which is ergonomically optimal for him in each case.

Arranged in the region of the rear end of the loading and removal opening 8 is a grid of lights 9, 10 which can be used for measuring the height of the storage goods respectively located on the storage goods carriers and which, furthermore, also fulfills an additional function, in that it serves to identify and check the position of the storage goods carrier 5 respectively introduced into the loading and removal opening, both its vertical position and its horizontal position being registered. As shown in FIG. 2, the grid of lights 10 extends between the top and bottom of the shelving column 1.

The determination of position is carried out with the aid of faceplates assigned to the storage goods carriers 5. In the particularly advantageous solution illustrated in the drawings, faceplates 11 are provided in the region of grip strips 12 and 13 at the opposite ends of the storage goods carriers 5. As can be seen from FIG. 5, the respective faceplate 11 is formed by a side wall 15 of the respective grip strip 12, provided with a window 14. The dimensions of the side wall 15 and the window 14 are in this case matched to the pitch t of the light barriers 16 of the grid of lights 9, 10, in such a way that in each case one light beam passes through the faceplate and one light beam is interrupted, that is to say masked out, by the faceplate. While the light beam which passes through is used for determining the position of the respective storage goods carrier 5, the interrupted light beam is used to inform a control system that a storage goods carrier 5 is located in the region of the loading and removal opening. The pitch t otherwise corresponds to half the distance A between the respective successive supporting profiles 6.

The invention claimed is:

1. A storage lift for storing storage goods comprising two shelving columns that are used to support storage goods carriers and are each provided with a plurality of pairs of supporting profiles for storage goods carriers that are arranged one above another and at a distance from one another, at least one of said columns has a loading and removal opening equipped with a grid of lights forming light barriers for detecting the height of the storage goods, and also comprising a vertical conveyor which can be moved up and down in a shaft between the shelving columns, said vertical conveyor being equipped with a horizontal conveyor device which has drivers by means of which the storage goods carrier can be transferred onto the vertical conveyor or removed from the vertical conveyor, characterized in that each storage goods carrier (5) is provided with at least one faceplate (11) through which in each case at least one light beam from the grid of lights (9, 10) can pass and by means of said faceplate (11) at least one light beam from the grid of lights (9, 10) is masked out when the respective storage goods carrier (5) assumes a predefined position in the loading and removal opening (8).

2. The storage lift as claimed in claim 1, characterized in that said at least one faceplate (11) is located in the region of at least one of the two ends of the storage goods carrier (5).

3. The storage lift as claimed in claim 2, characterized in that the grid of lights (9, 10) can be used for identifying the horizontal and vertical position of the storage goods carriers (5) in the loading and removal opening (8).

4. The storage lift as claimed in claim 2, characterized in that said at least one faceplate (11) is formed by at least one side wall (15) of a grip strip (12).

5. The storage lift as claimed in claim 4, characterized in that the grid of lights (9, 10) can be used for identifying the horizontal and vertical position of the storage goods carriers (5) in the loading and removal opening (8).

6. The storage lift as claimed in claim 4, characterized in that both side walls (15) of the grip strip (12) are formed as as one said faceplate (11), each said faceplate (11) forming each said side wall (15) being provided with an aligned window (14).

7. The storage lift as claimed in claim 6, characterized in that the grid of lights (9, 10) can be used for identifying the horizontal and vertical position of the storage goods carriers (5) in the loading and removal opening (8).

8. The storage lift as claimed in claim 1, characterized in that the grid of lights (9, 10) can be used for identifying the horizontal and vertical position of the storage goods carriers (5) in the loading and removal opening (8).

9. A storage lift comprising two shelving columns facing each other, each of said shelving columns being used to support storage goods carriers for goods of different heights to be stored on said storage goods carriers, each said shelving column being formed by a plurality of pairs of parallel longitudinal supporting profiles supporting said storage goods carriers, said longitudinal supporting profiles being arranged one above another and at a distance from one another, at least one of said shelving columns being provided with a loading and removal opening between two side walls, said loading and removal opening being equipped with means for detecting the height of the goods stored on said storage goods carriers in said at least one shelving column, said means for detecting including a grid of lights forming at least one light barrier, said storage lift also comprising a vertical conveyor which can be moved up and down in a shaft between said two shelving columns, said vertical conveyor being equipped with a horizontal conveyor device which has drivers by means of which the storage goods carrier can be transferred onto the vertical conveyor or removed from the vertical conveyor, characterized in that the side walls of the loading and removal opening (8) are provided with the parallel longitudinal supporting profiles (6) arranged one above another and at a distance from one another, said parallel longitudinal supporting profiles (6) adapted for inserting storage goods carriers (5) at different vertical positions of the loading and removal opening (8).

10. The storage lift as claimed in claim 9, characterized in that the distance (A) between the supporting profiles (6) extending over the entire height of the loading and removal opening (8) is equal to the distance (A) between the supporting profiles (6) of the shelving columns (1, 2).

11. The storage lift as claimed in claim 10, characterized in that the grid of lights (9, 10) can be used for identifying the horizontal and vertical position of the storage goods carriers (5) in the loading and removal opening (8).

12. The storage lift as claimed in claim 10, characterized in that the distances (A) between the supporting profiles (6) of the shelving columns (1, 2) and the supporting profiles (6) of the loading and removal opening (8) are equal to the pitch (t) of the light barriers of the grid of lights (9, 10).

13. The storage lift as claimed in claim 10, characterized in that the distances (A) between the supporting profiles (6) of the shelving columns (1, 2) and the supporting profiles (6) of the loading and removal opening (8) correspond to a multiple of the pitch (t) of the light barriers of the grid of lights (9, 10).

14. The storage lift as claimed in claim 9, characterized in that the grid of lights (9, 10) can be used for identifying the horizontal and vertical position of the storage goods carriers (5) in the loading and removal opening (8).

15. The storage lift as claimed in claim 14, characterized in that the distances (A) between the supporting profiles (6) of the shelving columns (1, 2) and the supporting profiles (6) of the loading and removal opening (8) are equal to the pitch (t) of the light barriers of the grid of lights (9, 10).

16. The storage lift as claimed in claim 14, characterized in that the distances (A) between the supporting profiles (6) of the shelving columns (1, 2) and the supporting profiles (6) of the loading and removal opening (8) correspond to a multiple of the pitch (t) of the light barriers of the grid of lights (9, 10).

17. The storage lift as claimed in claim 9, characterized in that the distances (A) between the supporting profiles (6) of the shelving columns (1, 2) and the supporting profiles (6) of the loading and removal opening (8) are equal to the pitch (t) of the light barriers of the grid of lights (9, 10).

18. The storage lift as claimed in claim 9, characterized in that the distances (A) between the supporting profiles (6) of the shelving columns (1, 2) and the supporting profiles (6) of the loading and removal opening (8) correspond to a multiple of the pitch (t) of the light barriers of the grid of lights (9, 10).

19. The storage lift as claimed in claim 9, wherein each of said shelving columns forms an internal space for receiving the storage goods carriers.

20. The storage lift as claimed in claim 9, wherein said loading and removal opening provides access to said at least one shelving column.

21. The storage lift as claimed in claim 9, wherein said at least one light barrier is formed from a plurality of individual lights extending from the top to the bottom of said at least one storage column.

* * * * *